Dec. 17, 1940.  R. H. ABBOTT ET AL  2,225,199
MULTIPLE HEARTH CALCINING FURNACE
Filed April 28, 1939  3 Sheets-Sheet 1

ROBERT H. ABBOTT
THOMAS A. DICKSON
JOHN WILLIAM BUCHER
INVENTORS

BY Martin E. Anderson
ATTORNEY.

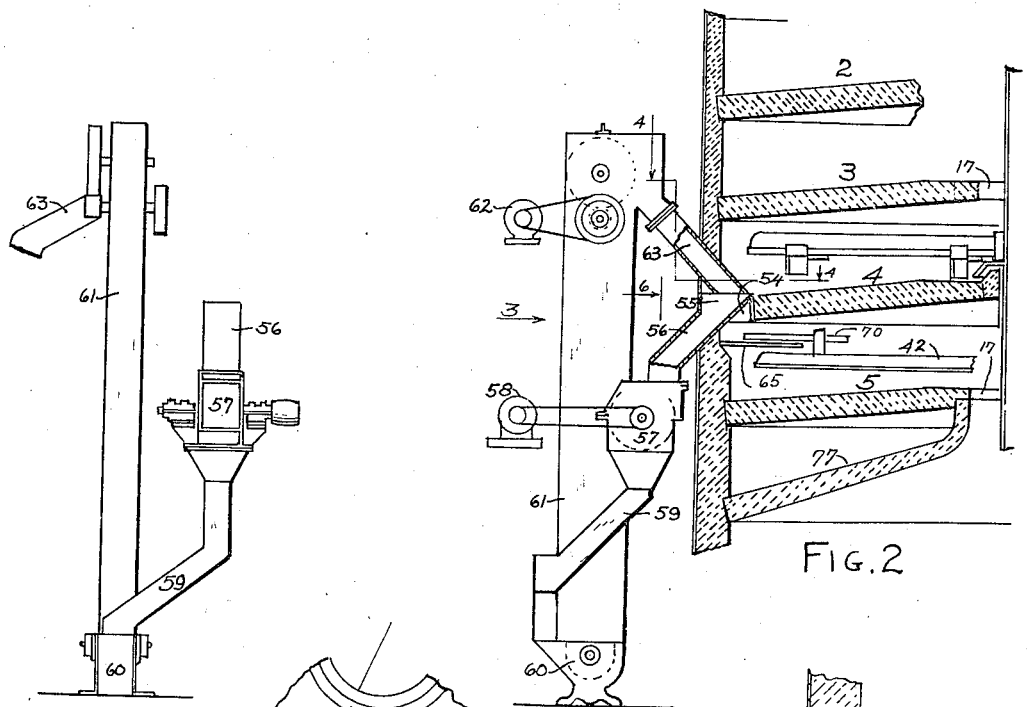
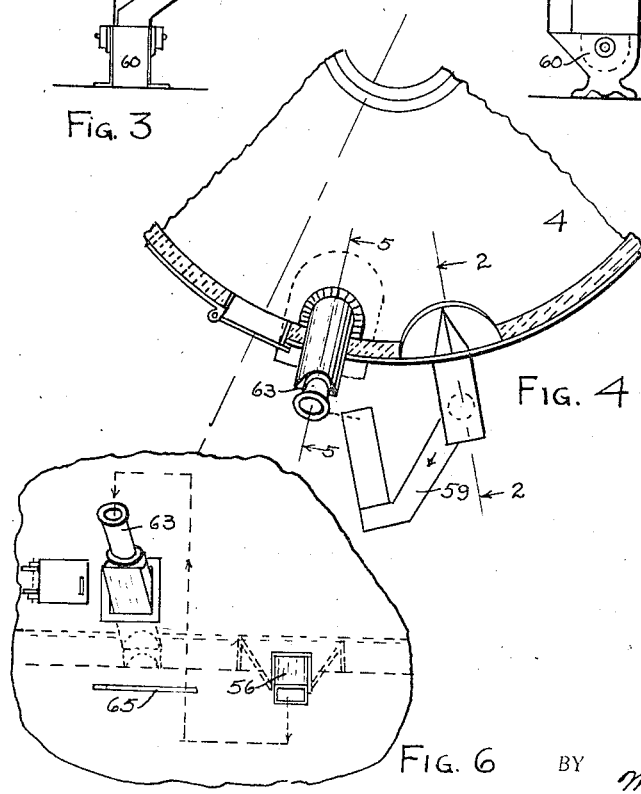
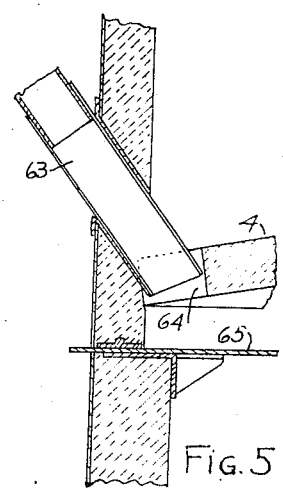

ROBERT H. ABBOTT,
THOMAS A. DICKSON.
JOHN WILLIAM. BUCHER
INVENTORS.

BY Martin E. Anderson
ATTORNEY.

Patented Dec. 17, 1940

2,225,199

UNITED STATES PATENT OFFICE 2,225,199

MULTIPLE HEARTH CALCINING FURNACE

Robert H. Abbott, Thomas A. Dickson, and John William Bucher, Denver, Colo., assignors to Colorado Iron Works Company, Denver, Colo., a corporation of Maine Application April 28, 1939, Serial No. 270,606

15 Claims. (Cl. 263—26)

This invention relates primarily to the apparatus, hereinafter described and to the method used for the dissociation of calcium carbonate, ($CaCO_3$) into lime (CaO) and carbon dioxide gas ($CO_2$) in a concentrated form for subsequent use.

At the present time in the beet sugar industry, a large quantity of limestone is used in processing the sugar beets to produce sugar. Limestone is crushed to a maximum diameter of ten or twelve inches and the finer material ranging in size from approximately two inches down, usually designated "spalls", resulting from the mining and crushing operation, is screened out. The limestone is then burned in the conventional type of vertical kiln using coke fuel as a source of heat and a sufficient amount of air to support combustion of the coke is admitted to the bottom of the furnace.

The heat generated converts the limestone into burned lime (CaO) setting free carbon dioxide gas ($CO_2$) and this with the products of combustion from the coke pass up through the charge in the furnace and are drawn off at the top by means of a gas pump, the burned lime being drawn off at the bottom of the kiln.

The reason why the fines or spalls are screened out as described above, is that they tend to seal up the charge in the kiln and prevent the free flow of gas and air through the charge. This results in the discarding of a considerable amount of fine limestone at the kiln as repeated efforts to burn the fine limestone in the conventional type of vertical kiln have failed.

The lime burning operation is usually conducted at the sugar beet processing plant, the burned lime (CaO) is first used, either in a finely ground state or as milk of lime to produce a lime saccharate which is later carbonated with the carbon dioxide gas ($CO_2$) produced from the lime burning operation.

In order to effect economical and satisfactory results in the carbonating steps of the process it requires a gas concentration of at least 30% $CO_2$ and most plants desire a gas containing 34% $CO_2$ or higher, which it is difficult to maintain with the present type of vertical kiln.

In the carbonating steps of the beet sugar process the lime saccharates are broken up and the lime is reprecipitated as calcium carbonate ($CaCO_3$) which chemically is the same form in which it originally entered the plant as limestone. This precipitated calcium carbonate, which is commonly known as lime mud or lime cake, is filtered off and washed commercially free of sugar solution after which it is sent to the sewer or to ponds as a waste product.

Similar calcium carbonate waste products are produced from other industries, notably the paper pulp industry, and it is well known to those familiar with the art that these waste calcium carbonate products have been successfully burned in the conventional multiple hearth type of furnaces to CaO, again driving off the carbon dioxide ($CO_2$) which is carried off to the atmosphere with the combustion gases and is wasted.

Exhaustive tests conducted with the conventional multiple hearth type of furnace have demonstrated that the lime mud resulting from the processing of sugar beets can be successfully and economically burned to a very high quality calcium oxide (CaO) using natural gas, oil or other extraneous fuel. We have also demonstrated, by repeated tests, that the fine limestone (spalls) rejected at the quarries can also be burned to a very high quality lime in the multiple hearth type furnace, and we have also demonstrated that practically any mixture of spalls and lime mud can be successfully burned in a multiple hearth type furnace to a high quality lime.

We have also demonstrated that the lime burned in the multiple hearth type furnace is more completely burned than in the vertical kiln type of furnace, and that the degree of burning to produce a quick slaking or a slow slaking lime can be definitely and accurately controlled in the multiple hearth type of furnace.

We have further demonstrated, by our repeated tests, that it is possible to produce a gas in the conventional multiple hearth type furnace, when using natural gas or oil as fuel fired directly into the hearths, with a carbon dioxide content of from 16 to as high as 22 per cent. $CO_2$, but due to the presence of all of the products of combustion from the fuel 22% $CO_2$ is the approximate limit that can be reached with gas fuel.

As the sugar beet processing plants require a gas containing 30% of $CO_2$ or higher, it is apparent that the gas containing 22% $CO_2$ or less, produced in the conventional type of multiple hearth furnace, operated in the conventional manner, is not economically or commercially acceptable to the beet sugar plants.

It has been further demonstrated that the reburned lime produced from the lime mud, which is now a waste product in the beet sugar plants, is in a much finer state of subdivision than the ground, burned lime ordinarily used, that the reactions in the beet sugar process are faster and more complete, and that a lesser quantity is required than of the burned lime now generally used.

The improvement in our process, which is new, consists in reburning the lime mud, which is now a waste product, in burning the spalls or fine lime rock now left at the quarries, or a combination of the two, in a multiple hearth type furnace so constructed and operated as hereinafter described as to produce not only a high quality of burned lime but also a carbon dioxide gas containing from 30 to 40 per cent of $CO_2$ and to accomplish this both economically and continuously.

In the conventional type of vertical kiln the gas offtake is connected to an exhaust fan or pump and the rate of combustion within the kiln, and therefore the rate of $CO_2$ gas production from the limerock and coke, is controlled by the speed of the exhaust pump to meet, within certain limits, the needs of the carbonating step of the beet sugar process.

Our apparatus is a multiple hearth type of furnace in which several of the hearths are provided with muffled arches, the bottom portion of which is made of "Carbofrax" or other refractory material of high heat conductivity, the upper portion or muffle roof being constructed of fireclay tiles to form a substantially gas tight combustion space inside the muffle.

Gas or oil is introduced into the combustion space through suitable burners and the resultant heat is conducted through the carbofrax floor of the muffle and radiated onto the hearth below.

The waste heat in the spent combustion gases in the muffles is withdrawn into a by-pass flue or flues and conducted to the upper hearths for drying and preheating the wet incoming lime mud feed.

Depending upon local conditions, from ten to twenty per cent. of the combustion gas can be burned directly into the hearths in direct contact with the lime and still maintain a carbon dioxide gas production of 30% $CO_2$ content or higher.

The above and other objects which may become apparent as the description proceeds and to which attention may be called are attained by means of a construction and an arrangement of parts that will now be described in detail and for this purpose reference will be had to the accompanying drawings in which the invention has been illustrated, and in which:

Figure 2 is a fragmentary vertical section taken on line 2—2, Figure 4;

Figure 3 is a side elevation of a grinding and elevating apparatus, looking in the direction of arrow 3, Figure 2;

Figure 4 is a section taken on line 4—4, Figure 2;

Figure 5 is a section taken on line 5—5, Figure 4;

Figure 6 is a view looking in the direction of arrow 6, Figure 2 and shows in side elevation a portion of the furnace wall;

Figure 1:
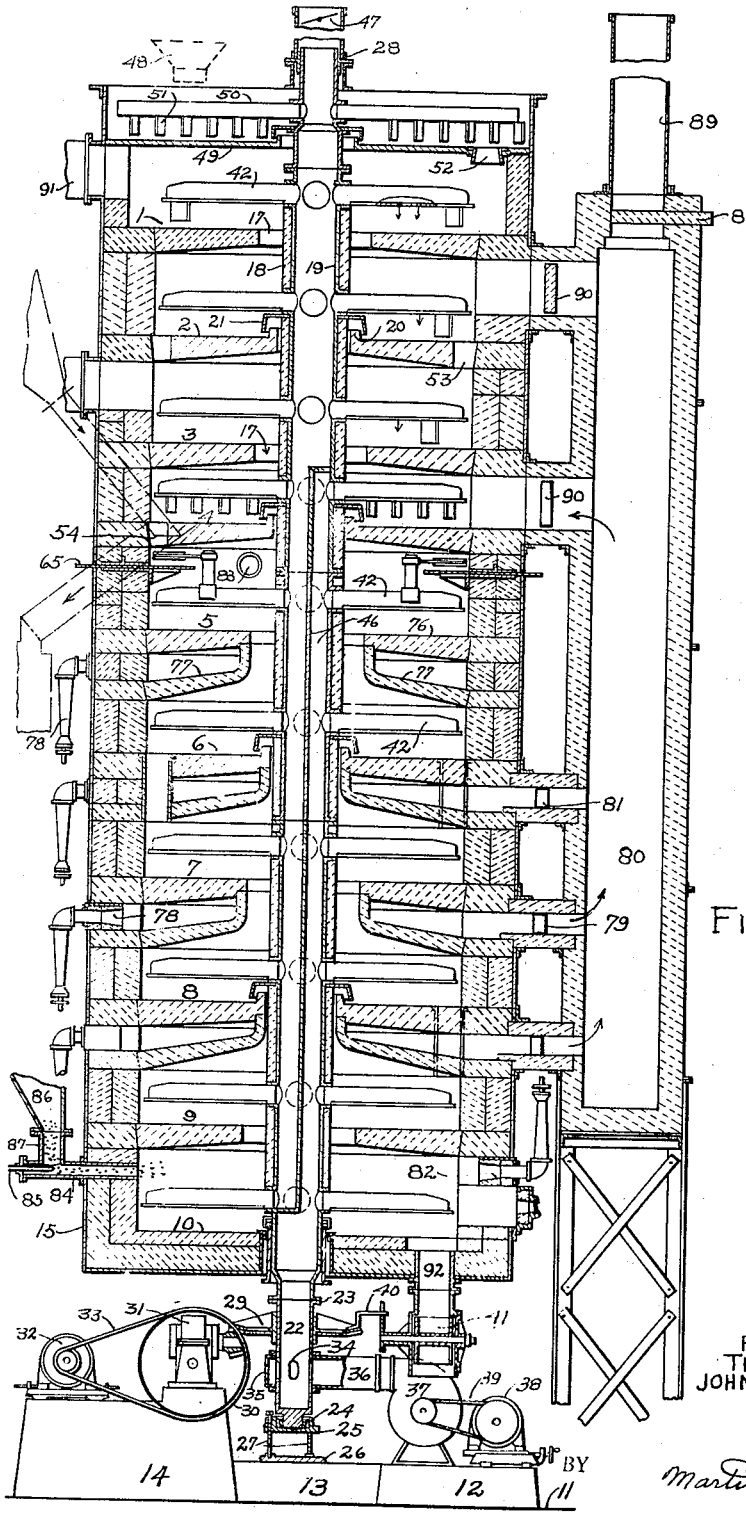
Figure 1 is a vertical diametrical section through a calcining furnace constructed in accordance with this invention.

In the drawings reference numeral 11 designates the upper surface of a foundation on which the furnace is supported in any substantial manner. The exact construction of the supports has not been shown because it is the part that involves merely engineering practice and mechanical skill. Supported on the foundation 11 are foundation blocks 12, 13 and 14, which serve as supports for certain parts of the apparatus which will be hereinafter described.

The calcining furnace which forms the subject of this invention has been shown as having a sheet metal shell 15 which is lined with suitable refractory material such as fireclay blocks and the inner course which has been designated by reference numeral 16, is formed from very refractory fire resisting material. The furnace represented in cross section in Figure 1 is approximately fifty feet in height and over twenty-four feet in diameter and the parts shown on the drawings are therefore shown to a greatly reduced scale. The interior of the furnace is divided by transversely extending hearths of which ten have been shown and these have been numbered in order from 1 to 10, which begin at the upper hearth. The hearths comprise annular members from fireclay and have their outer edges built into the wall of the furnace and extend inwardly towards the center in the manner shown. The hearth 1 is provided with a center opening of considerable diameter so as to provide an annular space 17 between the wall of the opening and the outer wall 18 of the hollow rabble shaft 19. It will be observed that the rabble shaft has an outer layer of highly refractory material which protects the metal from the effect of the high temperature. It will be noted that hearth 2 has a smaller central opening than hearth 1 and this is surrounded by an upwardly extending flange 20 which cooperates with the downwardly extending flange 21 of a disk-like member that is attached to the rabble shaft. The flanges 20 and 21 serve to prevent or at least limit the amount of material that can pass through the opening between the shaft and the hearth. Hearth 3 is constructed in the same manner as hearth 2 and hearth 4 is constructed in the same manner as hearth 2.

Referring now more particularly to the rabble shaft 19, it will be seen that the lower end thereof is attached to a tubular support 22 by means of flanges 23 connected by suitable bolts. The lower end of member 2 is supported on a roller bearing 24 which has not been shown in detail in Figure 1 because its construction is conventional and does not form any part of the present invention. The bearing block 25 is supported from a base plate 26 by means of jack screws 27 which can be turned for the purpose of effecting a vertical adjustment of the rabble shaft. The upper end of the rabble shaft rotates in a roller bearing 28 which serves to hold it steady in vertical position. Since this roller bearing is merely conventional, it has not been illustrated in detail. It is now evident that the rabble shaft can be rotated and for the purpose of effecting such a rotation, a bevel gear 29 is secured to the hollow member 22 and operatively connected wtih a pinion 30 that is driven through a suitable worm gear positioned in the housing 31 and power for operating this gear is provided by a motor 32 which transmits power for rotating the rabble shaft through a plurality of V-belts 33. The driving mechanism has been shown more or less conventional as it does not form part of this invention, except insofar as it constitutes one element of the combination. It will be observed that the hollow member 22 is provided with a number of openings 34 and that it is surrounded by a housing 35 in which it rotates. This housing is connected by means of a duct 36 with the exhaust port of a centrifugal fan 37 which is driven from a motor 38 through the medium of belts 39. It will be observed that the bevel gear 29 is provided with a radially extending arm 40 whose function is to operate a discharge valve 41 once each revolution of the rabble shaft. The construction of the rabble shaft and the rabble arms 42 with which it is provided is conventional and will only be described to the extent necessary to enable the construction and operation to be understood.

Figure 9:
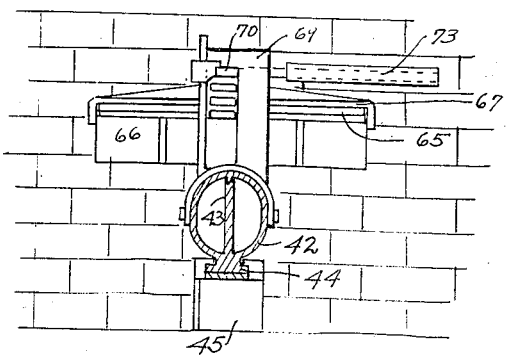
Figure 9 is a section taken on line 9—9, Figure 8.

The rabble arms 42 are hollow as shown in Figure 9 and are provided with partitions 43 that extend lengthwise thereof to a point near their outer ends. The purpose of the partitions is to permit air to circulate through the arms during the operation. The rabble arms are provided along their bottom surfaces with outwardly extending flanges 44 that serve to support a plurality of rabble blades 45. The rabble shaft is provided with two vertical partitions 46 that divide the interior into sector shaped chambers two of which are in communication with the interior of member 22 and the interiors of the rabble arms on one side of the partition 43, while the other chamber is in communication with the rabble arms on the other side of the partition 43 and in communication with the upper end of the shaft. With this arrangement air supplied to the rabble shaft is forced to circulate through the arms passing outwardly along one side of partition 43 and inwardly along the other side thereof. The purpose of this air circulation is to maintain the temperature of the arms sufficiently low to prevent injury from the high temperatures in which they are operated. The rabble arms located above hearth 4 are provided with openings through which air may pass into the furnace and are not provided with the partitions 43. A damper 47 serves to force the air to pass through the rabble arms and into the drying compartment during operation so that heat may be transferred from the compartment below hearth 4 to that above during operation of the furnace. In the construction illustrated, the rabble shaft will be surrounded as rotating in a clockwise direction when viewed from the top.

Material usually in the form of a carbonate mud, such as a lime mud or a magnesium carbonate mud or any other carbonate mud, either by itself or mixed with spalls or spalls alone are delivered to a suitable hopper 48 from which it is fed to the drying hearth 49. Six rabble arms 50 provided with suitable rabble blades 51 project radially from the rabble shaft above the drying hearth 49 and the blades are so inclined that they gradually transfer the material towards the outside of the hearth where it falls through an opening 52 onto hearth number 1. The rabble arm 42 in the position above hearth 1 is provided with rabble blades so inclined that they move the material towards the center where it passes through opening 17 and onto hearth number 2. The rabble blades on the arms above hearth 2 are so arranged that they move the material outwardly so as to make it fall through the openings 53 onto hearth number 3 where the action of the rabble blades moves it inwardly to opening 17 where it falls on hearth number 4 where it is moved outwardly towards a discharge opening which has been designated by reference numeral 54. Hearth number 4 forms a dividing partition between the upper and the lower compartments and flanges 20 and 21 function as a seal to prevent gases from passing from the compartment below this partition to the drying compartment above.

The material for which this furnace has been principally designed is a carbonate mud and this must be dried before the calcining operation can be commenced and this drying takes place in part on drying hearth 49 and is completed in its passage over hearths 1, 2 and 3; and the parts are so designed that the mud is thoroughly dry by the time it passes from the hearth number 3 onto hearth number 4, or if not thoroughly dry so nearly so that the drying operation will be entirely completed by the time it is discharged into opening 54. During the drying operation the mud forms cakes or hard bodies that must be broken up before they can be properly calcined and the apparatus employed for this purpose will now be described.

Referring now more particularly to Figures 2, 3, 4, 5 and 6, it will be seen that opening 54 in hearth 4 has positioned therein a metal flue 55 which terminates in a rectangular spout 56. When the rabble arm is operating the blades force the material outwardly and discharge it into the flue or hopper 55 from which it passes by the action of gravity into a pulverizer 57, which may be of the hammermill type. This pulverizer is operated by power derived from a motor 58. From the discharge of the pulverizer, the material passes through a conduit 59 to the bottom hopper 60 of an elevator 61. The elevator is so constructed that it can handle the hot material and is driven by power derived from the motor 62. The elevator discharges the comminuted carbonate into the upper end of the downwardly inclined conduit 63 which passes through the wall of the furnace and extends into an opening 64 in hearth 4 so that the material will pass through this hearth and onto the supporting plate 65 where the material builds up and forms a seal that prevents gases from passing from the compartment below the hearth 4 which, as above mentioned, serves as a partition separating the calcining compartment from the drying compartment.

Other means for breaking up the lumps formed during the drying may be substituted for the one shown and one type of such means may consist of a roller attached to each of the rabble rams 42 and resting on the upper surface of hearth 4. Such rollers when they are dragged around by the rabble arms will function to break up any lumps formed during the drying. Although other means may be used for this purpose. The arrangement illustrated in Figures 2 to 6 is considered to be preferable as by such means the extent of the comminution can be quite positively determined and controlled.

Figure 7:
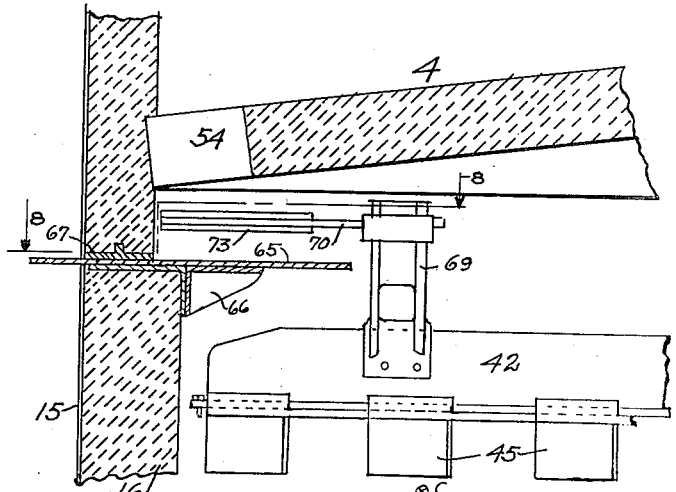
Figure 7 is a section taken on line 7—7, Figure 8.
Figure 8:
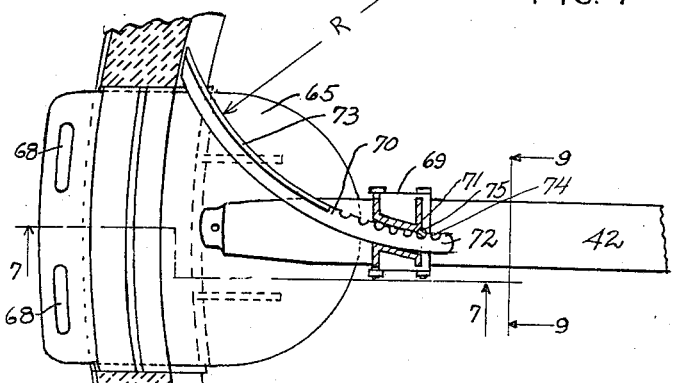
Figure 8 is a section taken on line 8—8, Figure 7.

It is evident that unless the material is removed from the upper surface of plate 65, a stoppage of the flow will soon occur and means has therefore been provided to remove material from this seal and deposit it on hearth 5 and such means has been illustrated in Figures 7, 8 and 9 to which reference will now be had.

Referring now more particularly to Figures 7, 8 and 9, it will be seen that plate 65 projects through a slot in the wall of the furnace and is supported on a bracket 66. A plate 67 is built into the wall on the upper surface of plate 65 for the purpose of supporting the fire brick lining. Plate 65 is provided with hand holes 68 that can be engaged by a tool for the purpose of moving it inwardly or outwardly. It is apparent that the farther plate 65 projects into the furnace, the more material will be supported thereon before it will overflow and in this way the sealing action can be made secure.

As above intimated, the sealing action of the material flowing through opening 54 will soon stop the flow unless the material is removed from plate 65 by some means and for this purpose each rabble arm 42 positioned above hearth 5 has been provided with an upwardly extending bracket 69 to which a curved arm 70 is adjustably attached. The bracket 69 is provided with a transversely inclined opening 71 through which the flattened end 72 of arm 70 projects. Arm 70 is curved about center c and is provided on its concave edge with flanges 73 which project both above and below, as shown in Figure 7. The concave edge of arm 70 is provided with plurality of notches 74 in one of which a bolt 75 is positioned to keep the arm from moving inwardly or outwardly and to adjust its position longitudinally. As the rabble arm rotates, arm 70 passes over the plate 65 and scrapes the accumulated material onto hearth 5 and in this manner a continuous feed is produced transferring material from the drying compartment to the calcining compartment below through a seal.

After the material has passed through hearth 4, it is subjected to heat for the purpose of liberating the carbon dioxide, and since a high concentration of carbon dioxide is desired the greater portion of this heat is generated by fuel burned in muffle arches of which four have been shown vertically spaced from each other. These muffle arches comprise annular hearths 76 made from fireclay and bottom wall members 77 made from "carbofrax." During the calcining operation the upper surfaces of hearths 5, 6, 7 and 8 are covered to a considerable depth with a layer of the material being calcined and since this is a poor conductor of heat, only a small portion of the heat passes into the material through the fireclay hearths. Most of the heat from the combustion within the muffle arches is transmitted through the "carbofrax" walls 77 and radiated into the interior of the furnace. The fuel, either gas or oil, is directed into the muffle arches by means of properly constructed fuel burners 78 as shown in the drawing. The fuel is mixed with the proper proportion of air to obtain complete combustion and each muffle arch is provided with a gas outlet opening 79 that communicates with a by-pass flue 80. Dampers 81 are provided in the outlets 79 so that these passages can be restricted to the amount necessary to get the desired combustion.

It is evident that if all of the fuel for calcining is burned in muffle arches, no products of combustion will be mixed with the carbon dioxide liberated from the carbonate, and in this manner it is possible to obtain a very high percentage of carbon dioxide. Since the carbon dioxide does not have to be concentrated to more than 34 per cent, it is permissible to burn some of the fuel in direct contact with the material, and for this purpose one or more burners 82 have been provided beneath the open hearth 9 and the products of combustion from these burners mixes with the carbon dioxide liberated from the carbonate. The proportion of fuel burned in the muffles and in direct contact with the material must be so proportioned that the desired concentration of gas is obtained.

The gas liberated from the carbonate during the calcining operation, together with the gases resulting from the consumption of fuel introduced through burner 82, is removed through an opening 83 positioned directly beneath hearth 4. Opening 83 is connected with a suitable suction pump that transfers the gas to a carbonator.

In the ordinary type of kiln used for generating carbon dioxide gas, the lime or other carbonate is mixed with coke and if the demand for gas increases the rate at which the air is introduced and removed from the calcining furnace or kiln determines the rate at which the carbon is consumed, and therefore the rate at which carbon dioxide is generated corresponds to the demand. In the present type of furnace where a great portion of the fuel is burned out of contact with the material and where the fuel burned directly in contact is mixed with the proper amount of air before it is introduced, it is evident that the capacity cannot be increased by merely increasing the demand, and in order to take care of emergencies that may arise, means has been shown for introducing carbon or carbonaceous fuel, such as pulverized coke or other suitable material into the combustion chamber of the calcining compartment whenever an excessive demand for gas must be met. In Figure 1, a device has been shown for introducing carbon into the combustion chamber and this consists of a tube 84 that passes through the wall of the furnace and opens beneath hearth 9. A pipe 85, positioned concentrically within tube 84, is connected with a source of air under pressure and the flow of air is controlled by suitable valves which have not been shown. A hopper 86 is connected with pipe 84 through a lateral opening 87 and when air is introduced through pipe 85 it will feed carbonaceous material from the hopper 86 to the interior of the furnace. The air that serves to feed the fuel furnishes sufficient oxygen for its combustion and the amount of carbon dioxide generated can therefore be increased above the normal capacity of the furnace by means of the auxiliary fuel introducing device.

In the above description it has been shown that the gaseous products of combustion from the muffle arches pass into the by-pass flue 80 and if the damper 88 is open these gases will escape through the flue 89. By closing the damper 88 and opening one or more of the dampers 90 that control the openings into the interior of the drying compartment, the hot gases from the muffle arches will be directed into the drying chamber and furnishes heat for drying the carbonate mud that is being treated.

In the above description it has been pointed out that the air that is made to circulate through the rabble arms positioned in the calcining compartment is forced through the rabble arms in the drying compartment and transfer heat to the latter, and this increases the efficiency of the apparatus.

The gaseous products of combustion leave the drying chamber through a flue 91 that extends to the outside of the building, or to a suitable chimney provided for the purpose of conducting these gases and releasing them at a suitable place.

Let us now assume that an apparatus constructed in the manner above described and illustrated on the drawings is available for the purpose of calcining carbonate mud or mixture of carbonate mud and spalls and that the latter is delivered to the feed hopper 48 so as to be discharged onto the drying hearth 49, and that the rabble shaft is rotating in a clockwise direction when viewed from above. We will further assume that fuel is being burned in the muffle arches and also in the interior of the calcining compartment by means of the burners 82. When the rabble shaft is rotating, it will move the material outwardly on hearth 49 until it drops through the opening 52 onto hearth 1, thence inwardly onto hearth 2 until it finally reaches hearth 4. The hearths have been so proportioned that by the time the material reaches hearth 4, it is dry and ready for the calcining step. As above explained, the material during the drying operation usually forms hard lumps or balls which must be broken up before they are subjected to the calcining operation, and for this purpose the material is passed through the pulverizer 57 shown in Figures 2 and 3 and delivered onto plate 65 beneath hearth 4, from which it is scraped by arm 70 onto hearth 5 of the muffle arch located directly beneath. The rabble arms and the plates attached thereto move the material inwardly and outwardly, thereby passing it from one hearth to another in a manner quite well understood by those versed in this art. The heat is so regulated that when the material reaches hearth 9, it has been changed from a carbonate to an oxide, and has liberated all the carbon dioxide contained therein, the material on hearth 9 is now an oxide and in case calcium carbonate is the material under treatment, the material, when it reaches hearth 9, will be lime and this will be passed into the lower section and onto hearth 10, from which it will be moved outwardly into opening 92 from whence it passes to the discharge valve 41 that is operated by the arm or arms 40 carried by gear 29. The lime or other oxide that results from the above treatment is now employed in the chemical process for which it is intended during which it is again converted into a carbonate, which, after passing through suitable driers, is returned to the hopper 48 for retreatment, thereby completing a cycle.

If spalls are to be calcined instead of a carbonate mud, they can be passed through the furnace in the same manner. It is evident, however, that spalls, being solid calcium carbonate, do not have to be dried, but in passing through the drying chamber, they are heated to a point slightly below that in which carbon dioxide is driven off. After the spalls pass into the calicning chamber, they are subjected to the same treatment as the carbonate mud and produce lime and carbon dioxide.

Although the principal use of this device as now contemplated is in connection with calcium carbonate and the production of calcium oxide therefrom, it is evident that any other carbonate can be treated in the same manner and it is therefore to be understood that it is not the intention to limit the use of this apparatus to the treatment of calcium carbonate, but that protection is desired for any use to which it can be put.

Having described the invention what is claimed as new is:

1. A multiple hearth furnace for calcining a carbonate, having a vertical elongated chamber, a partition separating the chamber into an upper and a lower compartment, a plurality of vertically spaced open hearths in the upper compartment, a plurality of vertically spaced muffle hearths in the lower compartment, means for feeding carbonate to the upper compartment, means for effecting a combustion of fuel in the muffles, means for heating the upper compartment by heat generated in the muffles, a rabble shaft provided with rabble arms, extending vertically in the chamber and through an opening in the partition, a seal between the shaft and the partition, means for transferring material from the upper to the lower compartment through another seal, means for burning fuel in the lower compartment in contact with the material therein for the production of carbon dioxide, and means for removing gases from near the top of the lower compartment.

2. A multiple hearth furnace for calcining a moist carbonate, having a vertical elongated chamber, a partition separating the chamber into an upper and a lower compartment, a plurality of vertically spaced open hearths in the upper compartment, a plurality of vertically spaced muffle hearths in the lower compartment, means for feeding carbonate to the upper compartment, means for effecting a combustion of fuel in the muffles, means for heating the upper compartment, a rabble shaft provided with rabble arms, extending vertically in the chamber and through an opening in the partition, a seal between the shaft and the partition, means for transferring material from the upper to the lower compartment through a seal; said means comprising a device for breaking lumps formed in the upper compartment, means for removing gases from near the top of the lower compartment, and means for removing oxide from the bottom of the kiln.

3. A multiple hearth furnace for calcining carbonate mud, having a vertical elongated chamber, a partition separating the chamber into an upper and a lower compartment, a plurality of vertically spaced open hearths in the upper compartment, a plurality of vertically spaced muffle hearths in the lower compartment, means for feeding carbonate mud to the upper compartment, means for effecting a combustion of fuel in the muffles, means for conveying the hot gases of combustion from the muffles to the upper compartment to heat the latter, a rabble shaft provided with rabble arms, extending vertically in the chamber and through an opening in the partition, a seal between the shaft and the partition, means for transferring material from the upper to the lower compartment through a seal, and means for removing gases from near the top of the lower compartment.

4. A multiple hearth furnace for calcining lime mud, and the like having a vertical elongated chamber, a partition separating the chamber into an upper and a lower compartment, a plurality of vertically spaced open hearths in the upper compartment, a plurality of vertically spaced muffle hearths in the lower compartment, means for feeding lime mud to the upper compartment, means for effecting a combustion of fuel in the muffles, means for heating the upper compartment, a rabble shaft provided with rabble arms, extending vertically through the chamber and through an opening in the partition, a seal between the shaft and the partition, means for transferring materials from the lower hearth in the upper compartment to the upper hearth in the lower compartment, said means comprising a device for breaking lumps formed in the upper compartment and a seal inhibiting the flow of gas from the lower to the upper compartment, and means for removing gases from the lower compartment from near the top thereof.

5. A multiple hearth furnace for calcining lime mud, having a vertical elongated chamber, a partition separating the chamber into an upper and a lower compartment, a plurality of vertically spaced open hearths in the upper compartment, a plurality of vertically spaced muffle hearths in the lower compartment, means for feeding lime mud to the upper compartment, means for effecting a combustion of fuel in the muffles, means for conveying the hot gases of combustion from the muffles to the upper compartment to heat the latter, a rabble shaft provided with rabble arms, extending vertically through the chamber and through an opening in the partition, a seal between the shaft and the partition, means for transferring materials from the lower hearth in the upper compartment to the upper hearth in the lower compartment, said means comprising a device for breaking lumps formed in the upper compartment, a seal inhibiting the flow of gas from the lower to the upper compartment, and means for removing gases from the lower compartment from near the top thereof.

6. A multiple hearth furnace for calcining lime mud and the like, having a vertical elongated chamber, a partition separating the chamber into an upper and a lower compartment, a plurality of vertically spaced open hearths in the upper compartment, a plurality of vertically spaced muffle hearths in the lower compartment, means for feeding lime mud to the upper compartment, means for effecting a combustion of fuel in the muffles, means for conveying the hot gases of combustion from the muffles to the upper compartment to heat the latter, a rabble shaft provided with rabble arms, extending vertically in the chamber and through an opening in the partition, a seal between the shaft and the partition, means for transferring material from the upper to the lower compartment through a seal, means for burning fuel in the lower compartment in contact with the material therein, and means for removing gases from near the top of the lower compartment.

7. A multiple hearth furnace for calcining lime mud and the like, having a vertical elongated chamber, a partition separating the chamber into an upper and a lower compartment, a plurality of vertically spaced, open hearths in the upper compartment, a plurality of vertically spaced muffle hearths in the lower compartment, means for feeding lime mud to the upper compartment, means for effecting a combustion of fuel in the muffles, means for conveying the hot gases of combustion from the muffles to the upper compartment to heat the latter, a rabble shaft provided with rabble arms, extending vertically in the chamber and through an opening in the partition, a seal between the shaft and the partition, means for transferring material from the upper to the lower compartment, said means comprising a device for breaking lumps formed in the upper compartment, a seal for inhibiting the flow of gases from the lower to the upper compartment, means for burning fuel in the lower compartment in contact with the material therein, and means for removing gases from the lower compartment near the upper end thereof.

8. A multiple hearth furnace for calcining lime mud and the like, having a vertical elongated chamber, a partition separating the chamber into an upper and a lower compartment, a plurality of vertically spaced open hearths in the upper compartment, a plurality of vertically spaced muffle hearths in the lower compartment, means for feeding lime mud to the upper compartment, means for effecting a combustion of fuel in the muffles, means for conveying the hot gases of combustion from the muffles to the upper compartment to heat the latter, a rabble shaft provided with rabble arms, extending vertically in the chamber and through an opening in the partition, a seal between the shaft and the partition, means for transferring material from the upper to the lower compartment through a seal, means for burning fuel in the lower compartment in contact with the material therein, means for introducing carbon and air into the lower compartment to produce additional carbon dioxide gas, and means for removing gases from the lower compartment near the top thereof.

9. A multiple hearth furnace for calcining lime mud and the like, having a vertical elongated chamber, a partition separating the chamber into an upper and a lower compartment, a plurality of vertically spaced open hearths in the upper compartment, a plurality of vertically spaced muffle hearths in the lower compartment, means for feeding lime mud to the upper compartment, means for effecting a combustion of fuel in the muffles, means for conveying the hot gases of combustion from the muffles to the upper compartment to heat the latter, a rabble shaft provided with rabble arms, extending vertically in the chamber and through an opening in the partition, a seal between the shaft and the partition, means for transferring material from the upper to the lower compartment through a seal, means for burning fuel in the lower compartment in contact with the material therein, means for introducing additional carbon and air into the lower compartment to produce additional carbon dioxide gas, means for removing gases from the lower compartment near the top thereof, and means for removing lime from the bottom of the furnace.

10. A multiple hearth furnace for calcining lime mud and the like, having a vertical elongated chamber, a partition separating the chamber into an upper and a lower compartment, a plurality of vertically spaced, open hearths in the upper compartment, a plurality of vertically spaced muffle hearths in the lower compartment, means for feeding lime mud to the upper compartment, means for effecting a combustion of fuel in the muffles, means for conducting gaseous products of combustion from the muffles to the upper compartment for heating it, a hollow rabble shaft extending upwardly in the chamber and through an opening in the partition, a seal between the shaft and the partition, hollow rabble arms projecting radially from the hollow shaft in the upper compartment, the interiors of the arms being in communication with the interior of the shaft, means for introducing air under pressure to the interior of the shaft, said air moving upwardly and discharging into the upper compartment to transfer heat from the lower to the upper compartment, means for transferring material from the upper compartment to the lower compartment through a gas seal, and means for removing gases from the lower compartment near its top.

11. A multiple hearth furnace for calcining lime mud and the like, having a vertical elongated chamber, a partition separating the chamber into an upper and a lower compartment, a plurality of vertically spaced, open hearths in the upper compartment, a plurality of vertically spaced muffle hearths in the lower compartment, means for feeding lime mud to the upper compartment, means for effecting a combustion of fuel in the muffles, means for conducting gaseous products of combustion from the muffles to the upper compartment for heating it, a hollow rabble shaft extending upwardly in the chamber and through an opening in the partition, a seal between the shaft and the partition, hollow rabble arms in the upper compartment projecting radially from the hollow shaft, the interiors of the arms being in communication with the interior of the shaft, means for introducing air under pressure to the interior of the shaft, said air moving upwardly and discharging into the upper compartment to transfer heat from the lower to the upper compartment, a device for breaking up lumps formed in the upper chamber, means for transferring material from the upper compartment to the lower compartment, a seal for inhibiting the flow of gases from the lower to the upper chamber, and means for removing gases from the lower compartment near the upper end thereof.

12. A multiple hearth furnace for calcining carbonate mud, having a vertical elongated chamber, a partition separating the chamber into an upper and a lower compartment, a plurality of vertically spaced, open hearths in the upper compartment, a plurality of vertically spaced muffle hearths in the lower compartment, means for feeding carbonate mud to the upper compartment, means for effecting a combustion of fuel in the muffles, means for conducting gaseous products of combustion from the muffles to the upper compartment for heating it, a hollow rabble shaft extending upwardly in the chamber and through an opening in the partition, a seal between the shaft and the partition, hollow rabble arms in the upper compartment, projecting radially from the hollow shaft, the interiors of the arms being in communication with the interior of the shaft, means for introducing air under pressure to the interior of the shaft, said air moving upwardly and discharging into the upper compartment to transfer heat from the lower to the upper compartment, means for transferring material from the upper compartment to the lower compartment, said means including a device for breaking up lumps formed in the upper compartment and a seal for inhibiting the flow of gases from the lower to the upper compartment, means for introducing fuel into the lower compartment for combustion in contact with the material therein, means for introducing additional carbonaceous fuel and air into the lower compartment for combustion therein to increase the amount of carbon dioxide generated, and means for moving gases from the lower compartment near its top.

13. A multiple hearth furnace for calcining a carbonate, having a vertical elongated chamber, a partition separating the chamber into an upper and a lower compartment, a plurality of vertically spaced open hearths in the upper compartment, a plurality of vertically spaced muffle hearths in the lower compartment, means for feeding carbonate to the upper compartment, means for effecting a combustion of fuel in the muffles, means for heating the upper compartment by heat generated in the muffles, a rabble shaft provided with rabble arms, extending vertically in the chamber and through an opening in the partition, means for transferring material from the upper to the lower compartment through a seal, means for generating carbon dioxide in the lower compartment in contact with the material therein, and means for removing gases from near the top of the lower compartment.

14. A multiple hearth furnace for calcining a moist carbonate, having a vertical elongated chamber, a partition separating the chamber into an upper and a lower compartment, a plurality of vertically spaced open hearths in the upper compartment, a plurality of vertically spaced muffle hearths in the lower compartment, means for feeding carbonate to the upper compartment, means for effecting a combustion of fuel in the muffles, means for heating the upper compartment by means of heat generated in the muffles, a rabble shaft provided with tubular rabble arms, extending vertically in the chamber and through an opening in the partition, means for flowing heated air through the shaft and the rabble arms for cooling the latter and for heating the upper compartment, means for breaking lumps formed in the upper compartment, means for transferring material from the upper to the lower compartment through a seal; means for removing gases from near the top of the lower compartment, and means for removing oxide from the bottom of the kiln.

15. A multiple hearth furnace for calcining carbonate mud, having a vertical elongated chamber, a partition separating the chamber into an upper and a lower compartment, a plurality of vertically spaced open hearths in the upper compartment, a plurality of vertically spaced muffle hearths in the lower compartment, means for feeding carbonate mud to the upper compartment, means for effecting a combustion of fuel in the muffles, means for conveying the hot gases of combustion from the muffles to the upper compartment to heat the latter, a rabble shaft provided with rabble arms extending vertically in the chamber and through an opening in the partition, means for transferring material from the upper to the lower compartment through a seal, and means for removing gases from near the top of the lower compartment.

ROBERT H. ABBOTT.
     THOMAS A. DICKSON.
     JOHN WILLIAM BUCHER.